United States Patent Office 3,079,224
Patented Feb. 26, 1963

3,079,224
PREPARATION OF METAL BOROHYDRIDES
George F. Huff, Pittsburgh, Pa., assignor to Callery Chemical Company, Pittsburgh, Pa., a corporation of Pennsylvania
No Drawing. Filed May 13, 1957, Ser. No. 658,895
12 Claims. (Cl. 23—14)

This invention relates to alkali metal and alkaline earth metal borohydrides and more particularly to a novel method for their preparation by the reaction of a dialkoxyborane, $HB(OR)_2$, with an alkali or alkaline earth metal hydride, metal alkoxide, or metal tetraalkoxyborate.

The metallic borohydrides are excellent reducing agents, they provide efficient sources of hydrogen, and they may be used for the production of various boron compounds, e.g. diborane. The alkali metal borohydrides have been prepared by a variety of reactions, one reaction being that proposed by Schlesinger et al., United States Patent 2,534,533, in which an alkali metal hydride and a trialkylborate are reacted according to $4MH + B(OR)_3 = MBH_4 + 3MOR$, where M is an alkali metal and R is a lower alkyl radical. This reaction produces a mixture of solid products from which the metal borohydride must be recovered by extraction. These extractions are difficult and tedious because of the character of the solvents utilized, a preferred solvent being anhydrous ammonia, and because there is such a small proportion of borohydride in the crude solid reaction products. For example, when sodium hydride and methyl borate are used the crude solid product contains a maximum of 19.6% by weight sodium borohydride; and when lithium hydride and trimethylborate are used there is a maximum of 17.4% lithium borohydride in the crude reaction product. The suggested methods of preparing alkaline earth metal borohydrides, as well as other methods of preparing alkali metal borohydrides, are more complex, or they may require expensive reactants such as metal alkyls or diborane.

It is an object of this invention to provide a new, simple and direct method of preparing alkali metal and alkaline earth metal borohydrides. It is a further object to provide a method of preparing alkali metal and alkaline earth metal borohydrides from relatively inexpensive reactants. A still further object is to provide a method of preparing such borohydrides in which the desired borohydride is the only solid reaction product and can be recovered directly without necessitating difficult extractive processes.

This invention is based on the discovery that a dialkoxyborane completely and readily reacts with alkaline earth or alkali metal hydrides, alkoxides, or tetraalkoxyborates to produce a metal borohydride according to the equation

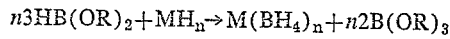

when the metal hydride is used and where $n$ is the valence of the metal ion M, and R is a lower alkyl radical; and according to

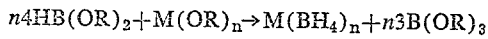

when the metal alkoxide is used; and according to

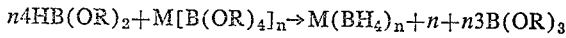

when the tetraalkoxyborate is used. It is not necessary that the lower alkyl radical of the metal containing reactant be the same as that in the dialkoxyborane to obtain reaction. It is generally preferred, however, to utilize reactants containing the same alkyl radical so that the reaction liquor does not contain mixed trialkylborates.

The only reaction products resulting in these reactions are the solid metal borohydride and liquid trialkylborate. The borohydrides are essentially insoluble in the liquid trialkylborate and in liquid mixtuers of alkoxyboranes and trialkylborates. The borohydrides may be separated by simple filtration or by another conventional method of separating solids from liquids. The recovered borohydride is dried to remove residual liquids and produce a high purity, usable product.

These reactions to produce metal borohydrides proceed readily when the reactants are contacted. Since dialkoxyboranes tend to disproportionate at ambient temperatures it is generally preferred to use a dialkoxyborane stabilized with a trialkylborate. Thus, for example, a mixture of trimethylborate and dimethoxyborane containing less than about 25 weight percent dimethoxyborane is relatively stable at ambient temperatures and is conveniently used as a dimethoxyborane source. Furthermore, the preferred methods of preparing dialkoxyboranes produce mixtures of dialkoxyboranes and trialkylborates which can be used directly to produce borohydrides by this invention.

In a typical reaction, one gram of sodium tetramethoxyborate was contacted with 23 ml. of dimethoxyborane-methyl borate solution containing 25 weight percent dimethoxyborane for one hour at 25° C. under an inert gas atomsphere. The solid product was separated by filtration and vacuum dried at room temperature for two hours. By chemical analysis for sodium, boron, and hydrolyzable hydrogen (i.e. molecular hydrogen produced by reaction with water) the product was determined to be sodium borohydride of 91% purity.

In the same manner, when 0.31 gram of sodium methoxide were contacted with 25 ml. of dimethoxyborane-methyl borate solution containing 25 weight percent dimethoxyborane, sodium borohydride of 91.5% purity was produced.

Metal borohydrides are produced in the same manner from reactions of other lower dialkoxyboranes such as diethoxyborane and dipropoxyborane. Other alkali metal and alkaline earth metal hydrides, alkoxides, and tetraalkoxyborates may be used to prepare the corresponding metal borohydride by reaction with lower dialkoxyboranes in like manner. For example, barium tetramethoxyborate, $Ba[B(OCH_3)_4]_2$, of 90% purity, was contacted with excess dimethoxyborane in methyl borate at room temperature. The liquid reaction products were evaporated leaving a solid residue which contained 75% barium borohydride, $Ba(BH_4)_2$. Additionally potassium borohydride is obtained from potassium hydride, lithium borohydride from lithium hydride, magnesium borohydride from magnesium hydride or magnesium tetraalkoxyborate, and calcium borohydride from calcium alkoxide or calcium hydride. These reactions may be carried out in a batch, semi-continuous or continuous operation.

If desired, the reactions may be conducted in the presence of an inert liquid such as in hydrocarbons, e.g. mineral oil and benzene, or in ethers. For example, some of the metal containing reactants, particularly the alkali metal hydrides, are most conveniently prepared and handled in a liquid hydrocarbon medium such as mineral oil. These slurries can be used directly without interfering with the reaction. To illustrate, a mineral oil slurry containing 27.7 grams of sodium hydride (10% sodium hydride) was contacted with 291 grams of trimethylborate-dimethoxyborane solution (11.6% dimethoxyborane) for one hour at room temperature. The solid product was separated by filtering off the supernatent liquid, washed with hexane solvent to remove residual mineral oil, and dried at atmospheric pressure at about 100° C. This product contained 97% sodium borohydride. In another reaction 24.8 mmoles of potassium hydride slurried in mineral oil was contacted with 109 mmoles of dimethoxyborane (4.3% concentration in methyl borate) for 1 hour at room temperature. The solid reaction product was separated, washed with diisopropyl, dried, and was found to contain 98.5% potassium borohydride.

The reaction proceeds regardless of the proportion of the reactants, but certain proportions are preferred in order to obtain high yields of pure metal borohydrides. Since the reactant metal compounds (i.e. hydrides, alkoxides, and tetraalkoxyborates) are solids and essentially insoluble in the liquid reaction components (i.e. alkoxyborates, dialkoxyboranes, and hydrocarbons) the product will contain any unreacted solids. For this reason it is desirable to use at least a stoichiometric amount of dialkoxyborane. Thus, for example, when 2 moles of dimethoxyborane (67% of stoichiometric) reacted with one mole of sodium hydride as a lurry in mineral oil, the solid product contained 48% sodium borohydride.

Similarly, the reaction proceeds regardless of the dialkoxyborane concentration in the reaction liquid, but in order to achieve complete reaction in a reasonably short time it has been found desirable to adjust initial proportions and concentrations so that the dialkoxyborane concentration is at least about 2% of the reaction liquor at the completion of the reaction. It has been determined that the rate of reaction increases with increasing concentrations of the dialkoxyborane, and that the reaction is slowed down if initial proportions and concentrations are such that the dialkoxyborane in the by-product liquid is below about 1 to 2%.

The results of a series of reactions illustrate this effect of concentration upon the reaction rate. In these reactions sodium hydride in mineral oil and trimethyl borate-dimethoxyborane solution were reacted with agitation at room temperature. Periodic samples of the reaction mixture liquid were removed and analyzed to determine the concentration of dimethoxyborane and the percent completion of the reaction at the various time intervals. In one reaction the dimethoxyborane concentration at the beginning of the reaction was 13.4 weight percent and the charge of sodium hydride adjusted so that the theoretical dimethoxyborane concentration in the by-product liquid would be 4.19%. Under these conditions the reaction was complete in 30 to 35 minutes. In a second reaction the initial dimethoxyborane concentration was 12.35 weight percent and its concentration in the by-product liquid was 6.56 weight percent. This reaction was complete in 15 to 20 minutes. In another reaction the initial concentration of dimethoxyborane was 8.24 weight percent and its concentration calculated for the by-product liquid assuming complete reaction was 1.1 weight percent. Under these conditions the reaction was only about 60% complete after 60 minutes. From these and other reactions it was determined that reasonably short reaction times are realized if the proportion of dialkoxyborane is sufficient to supply the stoichiometric amount with sufficient excess to give a 2% concentration in the reaction liquor at the completion of the reaciton.

It is preferred to carry out the reaction at ambient or room temperature. The reactions can be carried out at higher or lower temperatures if desired. For example, 10 g. of sodium hydride in 90 g. of mineral oil was contacted with 0° C. with 302 g. of dimethoxyborane-methyl borate solution containing 11.2% dimethoxyborane. The solids were separated after 60 minutes, washed with methyl borate, and vacuum dried at 100° C. This product was 93.5% sodium borohydride. At higher temperatures, e.g. above about 60° C., when using dimethoxyborane, it is desirable to keep the reaction under pressure to prevent volatilization and loss of the dialkoxyborane.

The reactions of this invention are carried out in the absence of air or water vapor to avoid destruction of the dialkoxyboranes by hydrolysis and oxidation reactions. This may be accomplished by using an inert non-oxidizing cover gas, e.g. nitrogen, hydrogen, argon, and methane.

The borohydrides recovered from the reactions contain insoluble impurities which are carried over from the reactants; therefore, it is preferred to use reactants of as high a purity as is practicable when uncontaminated borohydrides are desired.

In those reactions in which volatile dialkoxyboranes and trialkylborates are used, as well as those using volatile inert diluents, residual liquids on the borohydride product are removed by drying. In order to obtain essentially pure borohydrides the drying must be complete; this may be accomplished by ordinary drying at elevated temperatures, or if preferred, by vacuum drying at ambient or elevated temperatures. When inert diluents of low volatility are used it is preferred to remove the residual liquids on the borohydrides by washing with a light solvent and then removing residual solvent by drying as above. For example, when mineral oils are used, the borohydride product can be washed with light hydrocarbon solvents such as hexane or petroleum ethers, with trialkylborates, or with trialkylborate-dialkoxyborane mixtures. Washing with mixtures of trialkylborates and dialkoxyboranes may be particularly desirable because any unconsumed metal containing reactants will react during the washing operation.

According to the provisions of the patent statutes, I have explained the principle and mode of practicing my invention and have described what I now consider it to be its best embodiments. However, I desire to have it understood that, within the scope of the appended claims, the invention may be practiced otherwise than as specifically described.

I claim:
1. A method of preparing a metal borohydride which comprises contacting a lower dialkoxyborane and a compound selected from the class consisting of hydrides of alkali metals and alkaline earth metals thereby precipitating the metal borohydride in the resulting reaction liquor, and recovering the borohydride formed from said reaction liquor.

2. A method according to claim 1 in which the dialkoxyborane is in excess of the stoichiometric amount.

3. A method according to claim 2 in which the initial concentration of dialkoxyborane is so adjusted that the dialkoxyborane concentration in the said reaction liquor is greater than about 2%.

4. A method of preparing a metal borohydride which comprises contacting a mixture of a lower dialkoxyborane and a lower trialkylborate with a compound selected from the class consisting of hydrides of alkali metal and alkaline earth metals, thereby precipitating the metal borohydride in the resulting reaction liquor, and recovering the borohydride from the said reaction liquor.

5. A method according to claim 4 in which the dialkoxyborane is dimethoxyborane and the trialkyl borate is trimethylborate.

6. A method of preparing a metal borohydride which comprises contacting a mixture of a lower dialkoxyborane and a lower trialkylborate with a compound selected from the class consisting of hydrides of alkali metals and alkaline earth metals in an inert liquid thereby precipitating the said metal borohydride in the resulting reaction liquor, and recovering the borohydride formed from the said reaction liquor.

7. A method according to claim 6 in which the dialkoxyborane is in sufficient excess to provide a concentration of dialkoxyborane in the said reaction liquor of above about 2%.

8. A method according to claim 7 in which the dialkoxyborane is dimethoxyborane and the trialkylborate is trimethylborate.

9. A method according to claim 6 in which the said compound is sodium hydride.

10. A method of preparing sodium borohydride which comprises contacting a slurry of sodium hydride in a liquid hydrocarbon with a stoichiometric excess of dimethoxyborane in solution with trimethylborate at room temperature thereby precipitating sodium borohydride in the resulting reaction liquor, separating the said sodium borohydride from the said reaction liquor, washing said sodium borohydride with a volatile solvent for said liquid hydrocarbon, and drying said sodium borohydride.

11. A method according to claim 10 in which the volatile solvent is a solution of trimethylborate and dimethoxyborane.

12. A method according to claim 10 in which the volative solvent is hexane.

References Cited in the file of this patent

UNITED STATES PATENTS

| | | |
|---|---|---|
| 2,461,661 | Schlesinger et al. | Feb. 15, 1949 |
| 2,534,533 | Schlesinger et al. | Dec. 19, 1950 |
| 2,720,444 | Banus et al. | Oct. 11, 1955 |

OTHER REFERENCES

"New Developments in the Chemistry of Diborane and the Borohydrides, I, General Summary," by H. I. Schlesinger et al., Journal of the American Chemical Society, vol. 75, pages 188 and 190.

Gaylor: "Reduction with Complex Metal Hydrides," 1956, pp. 13, 20.

Sidgwick: Chemical Elements and Their Compounds, published by Oxford at the Clarendon Press, vol. I, 1950, p. 361.

Schechter et al.: Boron Hydrides and Related Compounds, Jan. 8, 1951; declassified Jan. 5, 1954; Callery Chemical Co., prepared under contract NOa(s) 10992, Dept. of the Navy, Bu Aer, pp. 46–47.